United States Patent
Melamed et al.

(10) Patent No.: US 11,636,361 B2
(45) Date of Patent: Apr. 25, 2023

(54) CONTENT RECOMMENDATIONS BASED UPON HISTORICAL FUTURE DATA

(71) Applicant: Oath Inc., New York, NY (US)

(72) Inventors: Roie Melamed, Haifa (IL); Yohay Kaplan, Tel-Aviv (IL); Yair Koren, Haifa (IL)

(73) Assignee: YAHOO ASSETS LLC, New York, NY (US)

( * ) Notice: Subject to any disclaimer, the term of this patent is extended or adjusted under 35 U.S.C. 154(b) by 358 days.

(21) Appl. No.: 16/928,308

(22) Filed: Jul. 14, 2020

(65) Prior Publication Data

US 2022/0019912 A1 Jan. 20, 2022

(51) Int. Cl.
*G06Q 30/00* (2012.01)
*G06N 5/04* (2006.01)
*G06N 20/00* (2019.01)

(52) U.S. Cl.
CPC ............... *G06N 5/04* (2013.01); *G06N 20/00* (2019.01)

(58) Field of Classification Search
None
See application file for complete search history.

(56) References Cited

U.S. PATENT DOCUMENTS

| 2018/0150874 A1* | 5/2018 | Chen | G06Q 30/0254 |
| 2021/0406670 A1* | 12/2021 | Zou | G06N 3/08 |
| 2021/0406838 A1* | 12/2021 | Ramanath | G06Q 50/01 |

\* cited by examiner

*Primary Examiner* — Matthew T Sittner
(74) *Attorney, Agent, or Firm* — Cooper Legal Group LLC (57) ABSTRACT

One or more computing devices, systems, and/or methods for content recommendations using historical future data are provided. A model serving delay time is computed as an average of training delays of events. A historical data time interval is determined based upon the model serving delay time. A model is trained for predicting user content preferences using historic user distribution data and historic content distribution data associated with the historic data time interval. The model is utilized to generate and provide content recommendations to users.

20 Claims, 8 Drawing Sheets

CONTENT RECOMMENDATIONS BASED UPON HISTORICAL FUTURE DATA

BACKGROUND

A recommendation system may be configured to provide content recommendations to users. The recommendation system may be hosted by a computing device, such as a server of a service provider, to which client devices of users can connect over a network. The recommendation system may provide content recommendations for a variety of different types of content, such as movie recommendations (e.g., a movie to rent through a media streaming service), service recommendations (e.g., a recommendation for a lawn service), product recommendations (e.g., a recommendation of a coat to purchase), website recommendations, music recommendations, ad recommendation, etc. The recommendation system may be configured to predict user content preferences of users in order to identify what content to recommend to the users. The recommendation system may take into account various user attributes of a user, such as age, gender, location, browsing history, past purchases, content the user has consumed (e.g., movies and music the user has consumed), and/or prior activities of the user. The recommendation system may take into account features of content items, such as a topic of an article, a price of a coat, what gender typically purchases the coat, what age of users watch a movie, etc. The recommendation system may take into account past user interaction with content recommendations, such as whether a user clicked on a content recommendation, whether the user performed an action after viewing the content recommendation such as purchasing a product, whether a user ignored the content recommendation, etc.

SUMMARY

In accordance with the present disclosure, one or more computing devices and/or methods for content recommendations based upon historical future data are provided. A recommendation system is configured to generate content recommendations that are provided through client devices to users. The recommendation system may utilize a model to predict user content preferences for determining what particular content to recommend to certain users. During a training phase, the model is trained on training data, such user distribution data and content distribution data indicating what types of users (e.g., features of users) interacted with particular content recommendations (e.g., features of content being recommended by the content recommendations) and what types of users did not interact with (ignored) content recommendations. For example, the model may be trained on impression data (e.g., a content recommendation is viewed by a user) and click data (e.g., content that was selected by the user, such as an ad click or a movie selection). In this way, various training data may be input into the model for training the model to predict user content preferences. Once trained, the model is used during a serving phase to serve traffic with content recommendations (e.g., serve a request from a website or application with one or more content recommendations to display to a user accessing the website or application).

There is an inherent lag between when the model is trained during the training phase and when the model is used to serve traffic during the serving phase. This lag can be caused by various factors, such as pre-processing of the raw input training (e.g., removal of accidental clicks of content recommendations, removal of duplication events such as an impression event followed by a click event by the same user, removal of fraudulent click data, etc.), indexing of the training data to improve quality and processing speed of the training data, loading the training data from storage, etc. The lag can be anywhere from minutes to hours. This lag can cause degradation in the prediction accuracy of the model because the user distribution (e.g., different users may be online at different times) and content distribution (e.g., new content providers may recently join the recommendation system, new content may become available, certain content may be available at certain times or on certain days, trends and changes in trends of what content is currently trending, etc.) can differ from when the training phase was performed and when the serving time is performed.

Accordingly, as provided herein, the lag between the training time and the serving time is predicted as a model serving delay time, which is used to identify historic user distribution data and historic content distribution data as historical future data used to more accurately train the model for predicting user content preferences. In particular, the model serving delay time is computed as an average of training delays of events. A training delay of an event corresponds to a difference in time between an event serve time of an event (e.g., a time at which the model was used by the content recommendation system to serve/provide a content recommendation to a client device resulting in an impression event of the user viewing the content recommendation, a click event of the user interacting with the content recommendation, or a user interaction event such as the user making a purchase) and a train time of the model that served the content recommendation associated with the event. In this way, the model serving delay time between when the model is trained and when the model is used to serve traffic is determined.

When the model is to be trained again, the model serving delay time is used to determine historic user distribution data and historic content distribution data for additionally training the model along with current user distribution data and current content distribution data. The historic user distribution data and the historic content distribution data may be determined based upon a historical data time interval. In an example of determining the historical data time interval, the historical data time interval is determined as a day prior to a current day plus the model serving delay time (e.g., if a current time is 8:00 am, the current day is Tuesday, and the model serving delay time is 2 hours, then the historical data time interval is Monday at 10:00 am). This formula may be used if the current day is within a set of weekdays. The set of weekdays may comprise Tuesday, Wednesday, Thursday, and Friday, for example. If the current day is a weekday not within the set of weekdays (e.g., Monday), then the historical data time interval is determined as a plurality of days (e.g., 3 days) prior to the current day plus the model serving delay time (e.g., if the current time is 8:00 am, the current day is Monday, and the model serving delay time is 2 hours, then the historical data time interval is Friday at 10:00 am). In an embodiment, if the current day is a weekend day (e.g., Saturday or Sunday), then the historical data time interval is determined as a week prior to the current day plus the model serving delay time (e.g., if a current time is 8:00 am, the current day is Saturday, and the model serving delay time is 2 hours, then the historical data time interval is the prior Saturday at 10:00 am). In another embodiment, if the current day is Sunday, then the historical data time interval is determined as a day prior to the current day plus the model serving delay time (e.g., if a current time is 8:00 am, the current day is Sunday, and the model serving delay time is 2 hours, then the historical data time interval is Saturday at 10:00 am)

The historical data time interval is used to identify historic user distribution data and historic content distribution data that occurred within the historical data time interval (e.g., information related to users, content recommended to the users, and whether users viewed content recommendations or not and/or interacted with the content recommendations or not, etc.). The historic user distribution data and historic content distribution data is used to supplement the current user distribution data and current content distribution data for training the model to more accurately predict user content preferences. In this way, the model is used to generate and provide content recommendations to client devices for display to users.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
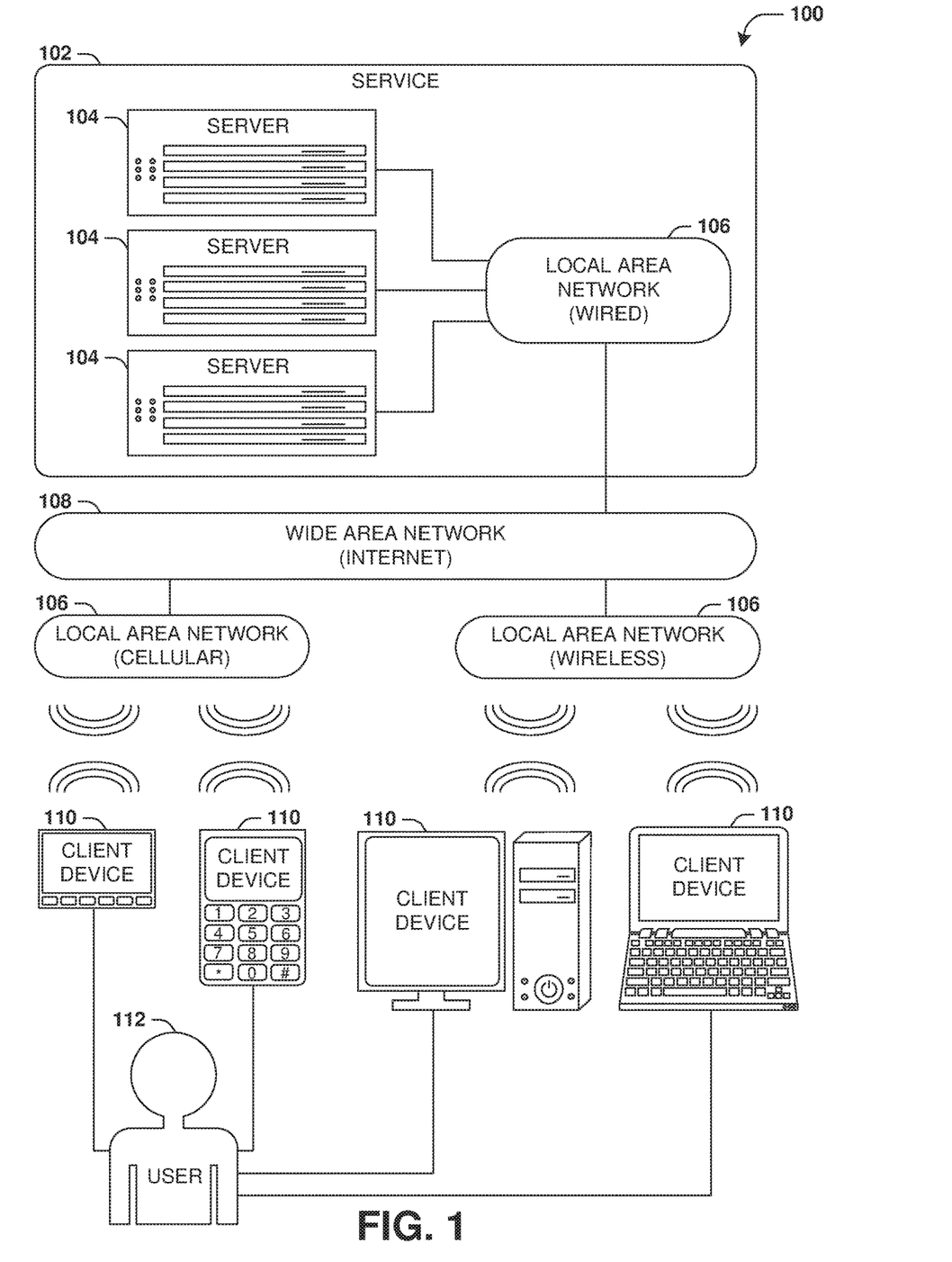
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ different architectures, may be compliant or compatible with differing protocols and/or may interoperate within the local area network 106. Additionally, a variety of local area networks 106 may be interconnected; e.g., a router may provide a link between otherwise separate and independent local area networks 106.

In scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
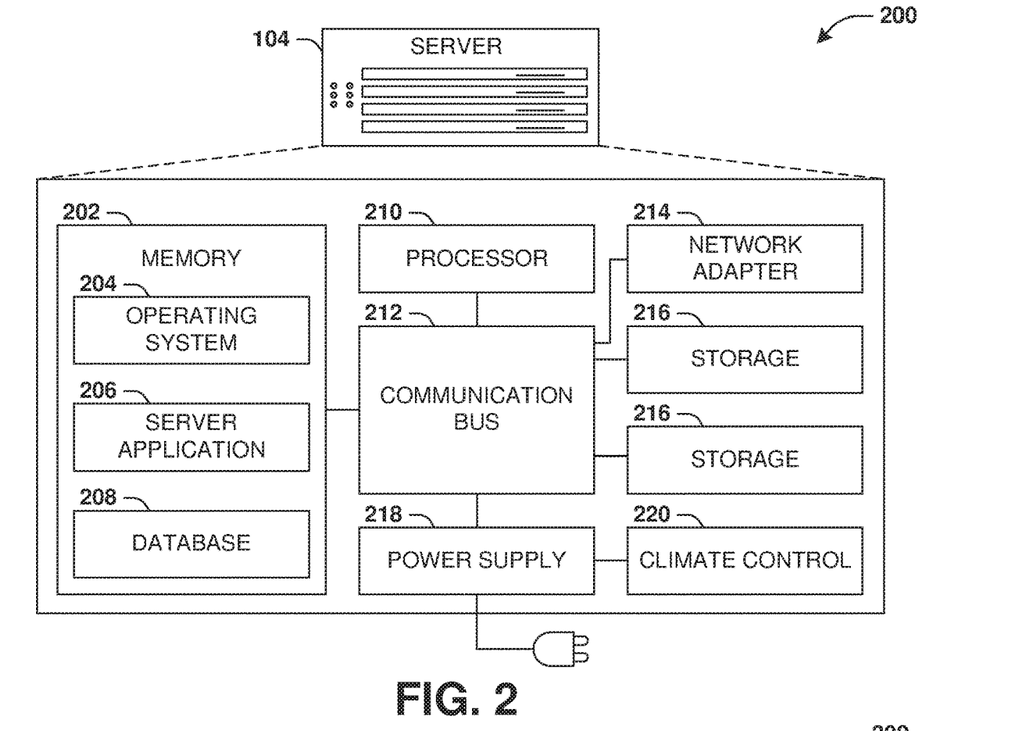
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
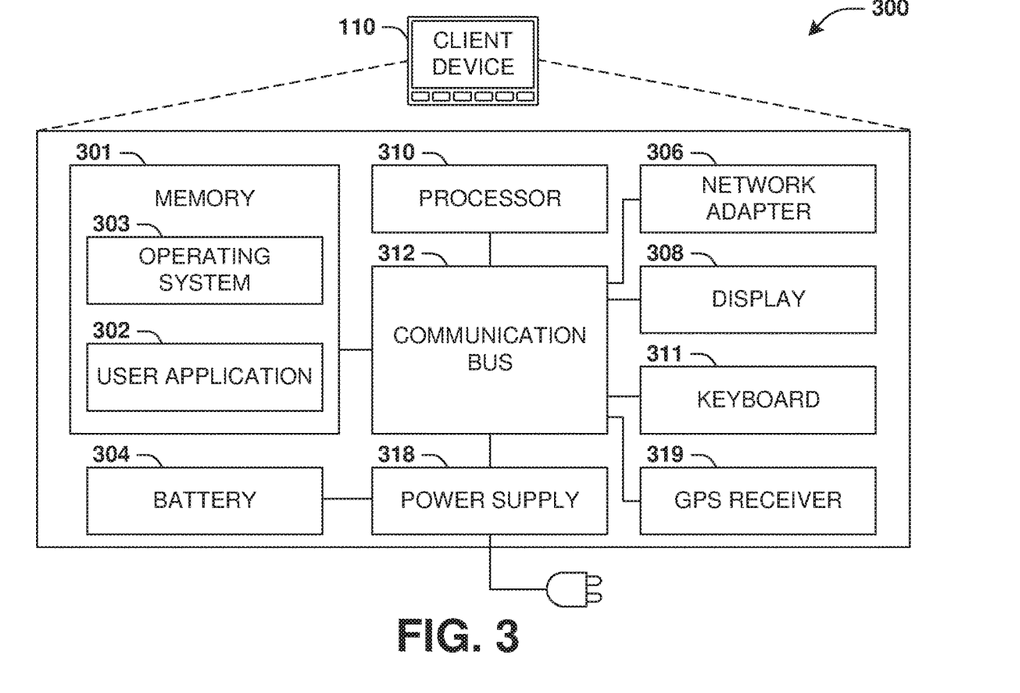
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

2. Presented Techniques

One or more systems and/or techniques for content recommendations based upon historical future data are provided. A recommendation system may be capable of generating and providing content recommendations of content to users. The recommendation system may be hosted by a computing device, a server, a virtual machine, hardware, software, or combination thereof. Client devices (e.g., a user device hosting an application being accessed by a user, a content provider of a website being accessed by the user device, etc.) may connect to the recommendation system over a network. The recommendation system may serve traffic with content recommendations. The traffic may correspond to requests from the client devices for content recommendations to provide to users. For example, an application hosted by a user device may transmit a request to the recommendation system for a content recommendation to display to the user through the application. In another example, a content provider of a website may transmit a request to the recommendation system for a content recommendation to display to the user through the website.

The recommendation system may utilize a model, such as machine learning functionality, to predict user content preferences of users to which content recommendations are provided. The recommendation system may take into account various user attributes of a user, such as age, gender, location, browsing history, past purchases, movies and music the user has consumed, and/or prior activities of the user. The recommendation system may take into account features of content items, such as a text within a website, a type of a product (e.g., lawn equipment, female clothing, etc.), what gender and age of users typically purchases the product, what age of users listen to a song, a duration of a song, a genre of a movie, a price of a product, etc. The recommendation system may take into account past user interaction with content recommendations, such as whether a user clicked on a content recommendation, whether the user performed an action after viewing the content recommendation such as purchasing a product, whether the user ignored the content recommendation, etc.

The model may be periodically trained during a training phase using current user distribution data and current content distribution data (e.g., features of users and features of content corresponding to content recommendations that are viewed or not by the users and/or interacted with or not by the users). For example, the model may be trained based upon various events, such as impression data of impression events (e.g., a content recommendation being viewed by a user) and click data of click events (e.g., whether a particular user interacted with a content recommendation or did not interact with the content recommendation). In this way, various training data may be input into the model for training the model to predict user content preferences. During training, the current user distribution data and the current content distribution data is initially raw input data, which is pre-processed before being used as input into the model to train the model to predict user content preferences of users.

In an example of pre-processing the raw input data of the current user distribution data and the current content distribution data, accidental clicks of content recommendations are removed from the raw input data. In another example of pre-processing the raw input data, duplication events are removed from the raw input data, such as where there is an impression event followed by a click event by the same user. In another example of pre-processing the raw input data, fraudulent click data is removed from the raw input data (e.g., click data corresponding to a threshold number of clicks by a user within a threshold timespan, such as a large number of clicks within a short time period). In another example of pre-processing the raw input data, the raw input data may be indexed to improve the quality and processing speed of using the raw input data to train the model.

The pre-processing of the raw input data to create training data to train the model can take time, which introduces lag between the training of the model and the serving of traffic by the trained model, which can be anywhere from minutes to hours. The lag is further increased due to loading of the raw input data (training data) from storage and/or due to other factors. This lag can cause degradation in the prediction accuracy of the model because the user distribution (e.g., different users may be online at different times) and content distribution (e.g., new content providers may recently the recommendation system, new content may become available, certain content may be available at certain times or on certain days, trends and changes in trends of what content is currently trending, etc.) can differ from when the training phase was performed to train the model and when the serving time is performed where the trained model is actively generating and providing content recommendations.

Because of this lag and discrepancy between training data (e.g., user distribution of users to which content recommendations were provided and content distribution of content items that were available to recommend) and serving data (e.g., user distribution of users for which content recommendations are being actively requested and content distribution of content items that are currently available to recommend), the model may make inaccurate user content preference predictions. Thus, the recommendation system may provide content recommendations that are irrelevant and/or annoying to users, which wastes processing resources and bandwidth with respect to generating, storing, and transmitting such content recommendations.

Accordingly, as provided herein, the model is trained to generate more accurate user content preference predictions and to take into account the lag between train time and serve time by training the model using historical future data. The historical future data corresponds to historic user distribution data and historic content distribution data that is additionally used to train the model in order to supplement current user distribution data and current content distribution model used to train the model. The historical user distribution data and the historical content distribution data corresponds to a time period that has a relatively high correlation and similarity to user and content distributions of when the model will be serving content recommendations. This time period is a historical data time interval that takes into account a model serving delay time. The model serving delay time corresponds to a difference between when the model was previously trained and when that trained model was previously used to generate and serve content recommendations.

Because the model serving delay time is taken into account when selecting the historical user distribution data and the historical content distribution data, the historical user distribution data and the historical content distribution data may have a relatively high correlation to the types of users and types of available content at serve time once the model is trained with the historical user distribution data and the historical content distribution data. This is because of the cyclic nature of user distributions and content distributions. That is, user distributions may be cyclical such that users may go online (e.g., routinely/habitually visit a news website, check an email application, etc.) at similar times during the week or on weekends (e.g., a similar group of users may routinely check their email at 8:00 am during the week). Similarly, content distributions may be cyclical such as where some content providers may only promote their content on weekends, for example.

Training the model using the historical user distribution data and the historical content distribution data that is relatively similar to the types of users and types of available content at serve time once the model is trained will improve the accuracy of the model to predict user content preferences. Improving the precision of the model to generate more accurate user content preference predictions improves the ability of the recommendation system to generate content recommendations that will be more engaging and relevant for users to which the content recommendations are provided by the recommendation system. Accordingly, the recommendation system more efficiently utilizes processing resources (e.g., by not wasting processing resources in generating irrelevant content recommendations with low user engagement), storage resources (e.g., by not wasting storage resources in storing irrelevant content recommendations with low user engagement), and network bandwidth (e.g., by not wasting network bandwidth in transmitting irrelevant content recommendations with low user engagement over a network to client devices, such as user devices and content providers of websites and services being accessed by the user devices).

Figure 4:
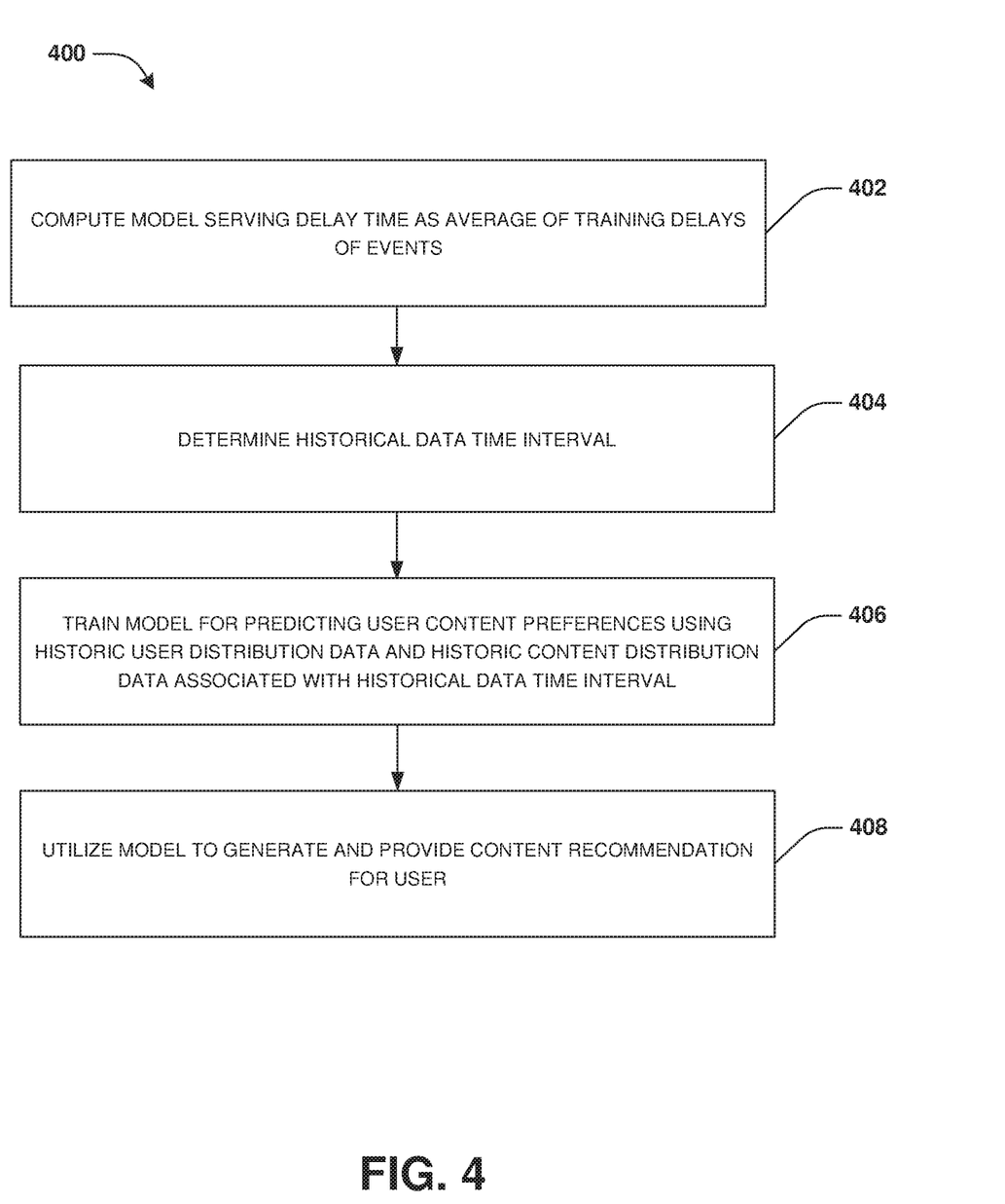
FIG. 4 is a flow chart illustrating an example method for content recommendations based upon historical future data.
Figure 5A:
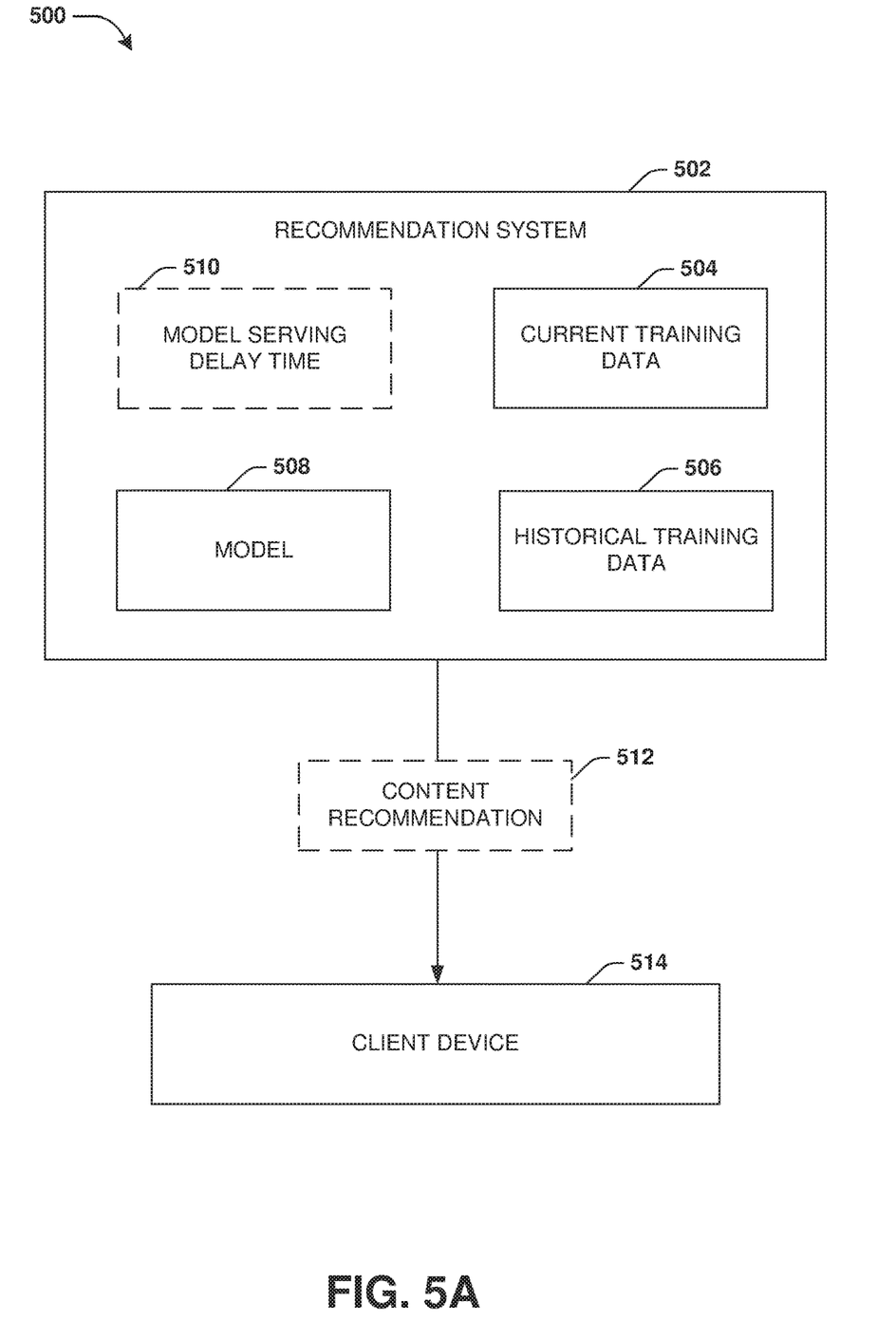
FIG. 5A is a component block diagram illustrating an example system for content recommendations based upon historical future data.

An embodiment of content recommendations based upon historical future data is illustrated by an example method 400 of FIG. 4, and is described in conjunction with system 500 FIG. 5A. A recommendation system 502, illustrated by FIG. 5A, may be implemented as hardware, software, or a combination thereof, such as a computing device, a server, a virtual machine, etc. The recommendation system 502 may be accessible to client devices (e.g., a user device hosting an application being accessed by a user, a content provider hosting a website or service being accessed by the user device, etc.) over a network, such as by being accessible to a client device 514. For example, the client device 514 may comprise a user device hosting an email application being accessed by a user. The email application may determine that a content recommendation can be displayed through a user interface of the email application. Accordingly, the email application of the client device 514 may transmit a request over the network to the recommendation system 502. The request may request a content recommendation from the recommendation system 502 to display through the user interface of the email application. The request may comprise user attributes of the user, such as age, location, gender, browsing history, purchase history, and/or a wide variety of information about the user that may be utilized by the recommendation system 502 to tailor the content recommendation to the interests of the user.

The recommendation system 502 may utilize a model 508 to predict user content preferences of the user based upon the user attributes and content attributes of available content to recommend to the user. In an example, the model 508 may assign ranks to the available content based upon predicted likelihoods that the user will interact with content recommendations of the available content. For example, a woman's dress may be ranked relatively lower than a football based upon the user being a 15 year old male having an interest in sports. A content recommendation 512 may be generated to recommend content having a highest rank indicative of a relatively high likelihood that the user will engage with the content recommendation 512 because the user has an interest in the content. Accordingly, the recommendation system 502 generates the content recommendation (e.g., a recommendation to purchase the football), and transmits the content recommendation 512 over the network to the client device 514 to display through the user interface of the email application to the user. In this way, content recommendations are created and provided to client devices during serve time.

In order for the model 508 to predict user content preferences of users for generating and serving content recommendations at serve time, the model 508 may be trained (e.g., periodically trained) using training data to understand what types of content will be engaging to certain types of users. For example, current training data 504 may be used to train the model 508 at train time. The current training data 504 may correspond to current user distribution data of users currently being served content recommendations by the recommendation system 502 and content distribution data of content available to serve and/or being served as content recommendations such users and whether users interacted with the content recommendations. Because of the time differences/lag between the train time of training the model 508 and the serve time of the trained model 508 serving requests with content recommendations, degradation in prediction accuracy of user content preferences can occur.

Accordingly, as provided herein, accuracy of the model 508 is improved by additionally training the model 508 on not just the current training data 504 but also select historical training data 506 corresponding to historic user distribution data and historic content distribution data determined to be similar to users and available content at a predicted serve time where the model will be serving traffic after being currently training. In order to identify what historical training data 506 to selectively use for training the model 508 of the recommendation system 502, entries of events that occurred during prior serve times of the model 508 serving content recommendations to client devices are generated and evaluated. In an example, an event may correspond to a content recommendation of a content item being displayed to a user (an impression). In another example, an event may correspond to a content recommendation of a content item being interacted with, such as clicked, by a user. In another example, an event may correspond to a user making a purchase of a content item (e.g., a product, a service, etc.) recommended by a content recommendation. When an event occurs, an entry for the event may be generated. The entry may comprise an event type of the event (e.g., an impression event, a click event, a purchase event, etc.), a serve time of the day and time and which the model 508 was used to generate and serve the content recommendation to a client device, a train time of when the model 508 was previous trained prior to the model 508 generating and serving the content recommendation at the serve time, etc. In this way, entries are created for events associated with the model 508 serving content recommendations to client devices.

At 402, a model serving delay time 510 may be computed based upon the entries corresponding to the events associated with the model 508 serving content recommendations to client devices. For example, an entry may be indicative of a training delay. The training delay may correspond to a timespan/delay between when the model 508 was trained at train time and when the trained model 508 served a content recommendation associated with the event at an event serve time. That is, the training delay of the event can be computed as a difference between the event serve time of the event and the train time of the model 508. In an embodiment, the model serving delay time 510 may be computed as an average of training delays of events associated with the entries tracked by the recommendation system 502 of past events associated with the recommendation system 502 generating and providing content recommendations to client devices. It may be appreciated that a variety of other techniques may be used to compute the model serving delay time 510 based upon the training delays of the events. In this way, the model serving delay time 510 corresponds to the delay/lag between the model 508 being trained at training time during a training phase and the trained model 508 being used at serve time during a serving phase to serve content recommendations to client devices.

Once the model serving delay time 510 has been computed by the recommendation system 502, the model serving delay time 510 can be accounted for and taken into consideration when selecting what historical training data 506 of historic user distribution data and historic content distribution data to use for additionally training the model 508 during a next training phase. The model serving delay time 510 can be used to leverage the notion that user distribution and content distribution is cyclical, such as where similar users may access a movie streaming service at similar times each day or where certain content items are only available on certain days such as where only certain movies are only available on weekends through the movie streaming service.

The model serving delay time 510 can be used to determine a historical data time interval that is used to select what historic user distribution data and historic content distribution data to include within the historical training data 506 for training the model 508. That is, historic user distribution data of users being served content recommendations during the historical data time interval may be candidates for inclusion within the historical training data 506 for training the model 508 (e.g., inclusion of attributes of the users, whether the users were displayed a content recommendation, whether the users clicked the content recommendation, whether the users performed an action after viewing the content recommendation such as purchasing a product or service, etc.). Similarly, historic content distribution data of content recommendations being served and/or available to be served to users during the historical data time interval may be candidates for inclusion within the historical training data 506 for training the model 508 (e.g., inclusion of content attributes of content being recommended by the content recommendations, whether a user was displayed a content recommendation, whether the user clicked the content recommendation, whether the user performed an action after viewing the content recommendation such as purchasing a product or service, etc.).

At 404, the historical data time interval is determined based upon various factors and criteria. In an embodiment of determining the historical data time interval, a current day for which the model 508 is to be trained is determined to be a weekday occurring within a set of weekdays. In an example, the set of weekdays may comprise Tuesday, Wednesday, Thursday, and Friday. It may be appreciated that the set of weekdays may comprise any designation of days. In response to determining that the current day is a weekday occurring within the set of weekdays, the historical data time interval is determined as a day prior to the current day plus the model serving delay time 510. For example, the current day may be Thursday at 9:00 am and the model serving delay time 510 is 3 hours. Accordingly, the historical data time interval is determined to be Wednesday (a day prior to Thursday) plus the 3 hour model serving delay time 510, and thus the historical data time interval is Wednesday starting at 12:00 μm. In an example, the historical data time interval may correspond to a particular timespan, such as 1 hour from 12:00 pm to 1:00 pm or any other timespan. In this way, historic user distribution data and historic content distribution data from Wednesday around 12:00 pm to around 1:00 pm is determined to be useful historical training data 506 for training the model 508 that is predicted to start serving traffic at 12:00 pm on the current day of Thursday, which is useful because the historic user distribution data and historic content distribution data may be similar to current users and current available content at 12:00 pm on Thursday.

Figure 5B:
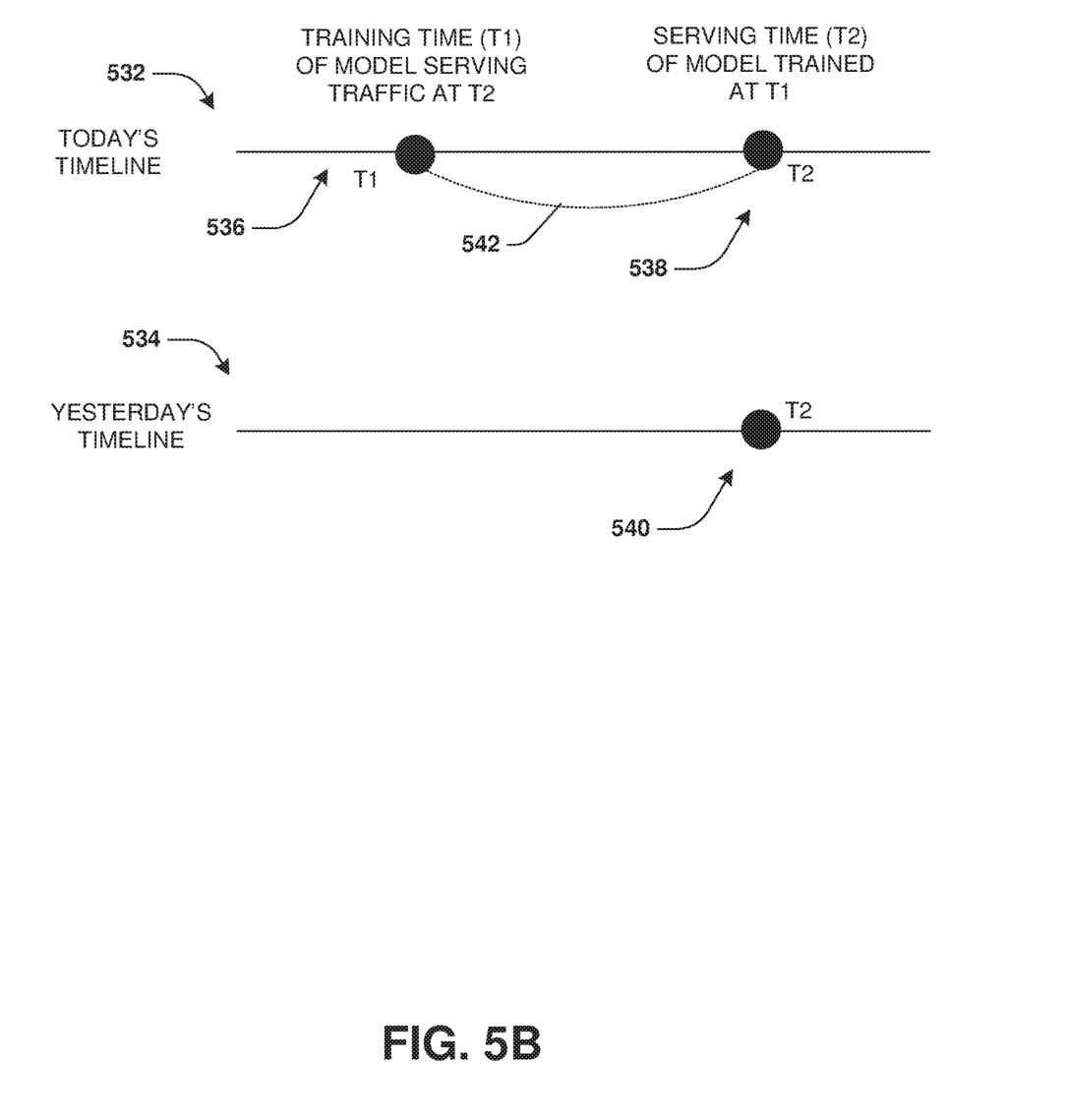
FIG. 5B is an illustration of example timelines utilized for identifying a historical data time interval.

FIG. 5B illustrates an example where the current day is a weekday within the set of weekdays. A current time may correspond to a training time (T1) 536 of the model 508 (e.g., 9:00 am on Thursday), illustrated along today's timeline 532. The model serving delay time 510 is illustrated along today's timeline 532 as model serving delay 542. Adding the model serving delay 542 to the training time (T1) 536 results in a predicted serving time (T2) 538 of when the trained model 508 is predicted to be serving traffic with content recommendations (e.g., 9:00 am+3 hours is 12:00 pm on Thursday). Accordingly, a historical data time interval is determined to start at the predicted serving time (T2) 538 on the day prior to the current day, as illustrated by time (T2) 540 on yesterday's timeline 534 (e.g., Wednesday starting at 12:00 pm).

In an embodiment of determining the historical data time interval, the current day for which the model 508 is to be trained is determined to be a weekday that does not occur within the set of weekdays (e.g., Monday). In response to determining that the current day is a weekday not occurring within the set of weekdays, the historical data time interval is determined as a plurality of days prior to the current day plus the model serving delay time 510. In an example, the plurality of days may comprise 3 days or any other number of days. In an example, Monday is the weekday that does not occur within the set of weekdays that includes Tuesday, Wednesday, Thursday, and Friday. For example, the current day may be Monday at 9:00 am and the model serving delay time 510 is 3 hours. Accordingly, the historical data time interval is determined to be Friday (3 days prior to Monday) plus the 3 hour model serving delay time 510, and thus the historical data time interval is Friday starting at 12:00 μm. In an example, the historical data time interval may correspond to a particular timespan, such as 1 hour from 12:00 pm to 1:00 pm or any other timespan. In this way, historic user distribution data and historic content distribution data from Friday around 12:00 pm to around 1:00 pm is determined to be useful historical training data 506 for training the model 508 that is predicted to start serving traffic at 12:00 pm on the current day of Monday, which is useful because the historic user distribution data and historic content distribution data may be similar to current users and current available content at 12:00 pm on Monday.

Figure 5C:
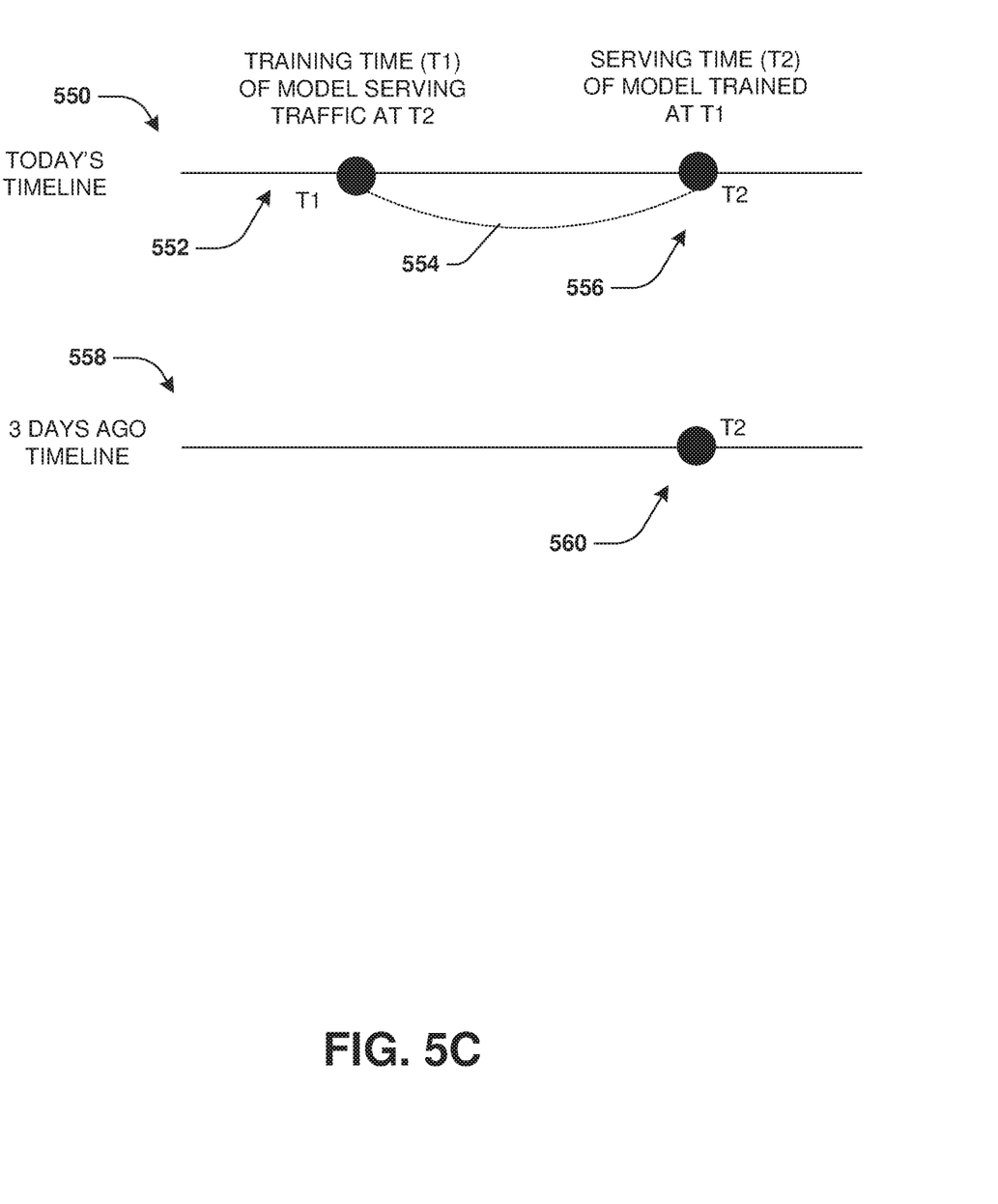
FIG. 5C is an illustration of example timelines utilized for identifying a historical data time interval.

FIG. 5C illustrates an example where the current day is a weekday that does not occur within the set of weekdays. A current time may correspond to a training time (T1) 552 of the model 508 (e.g., 9:00 am on Monday), illustrated along today's timeline 550. The model serving delay time 510 is illustrated along today's timeline 550 as model serving delay 554. Adding the model serving delay 554 to the training time (T1) 552 results in a predicted serving time (T2) 556 of when the trained model 508 is predicted to be serving traffic with content recommendations (e.g., 9:00 am+3 hours is 12:00 pm on Monday). Accordingly, a historical data time interval is determined to start at the predicted serving time (T2) 556 on a plurality of days prior to the current day (e.g., 3 days prior), as illustrated by time (T2) 560 on 3 days ago timeline 558 (e.g., Monday starting at 12:00 pm).

In an embodiment of determining the historical data time interval, the current day for which the model 508 is to be trained is determined to be a weekend day, such as Saturday or Sunday. In response to determining that the current day is a weekend day, the historical data time interval is determined as a week prior to the current day plus the model serving delay time 510. For example, the current day may be Saturday at 9:00 am and the model serving delay time 510 is 3 hours. Accordingly, the historical data time interval is determined to be the prior Saturday (if the current day is Saturday the 14$^{th}$, then the prior Saturday would be Saturday the 7$^{th}$) plus the 3 hour model serving delay time 510, and thus the historical data time interval is Saturday the 7$^{th}$ starting at 12:00 μm. In an example, the historical data time interval may correspond to a particular timespan, such as 1 hour from 12:00 pm to 1:00 pm or any other timespan. In this way, historic user distribution data and historic content distribution data from Saturday the 7$^{th}$ around 12:00 pm to around 1:00 pm is determined to be useful historical training data 506 for training the model 508 that is predicted to start serving traffic at 12:00 pm on the current day of Saturday the 14$^{th}$, which is useful because the historic user distribution data and historic content distribution data may be similar to current users and current available content at 12:00 pm on Saturday the 14$^{th}$.

Figure 5D:
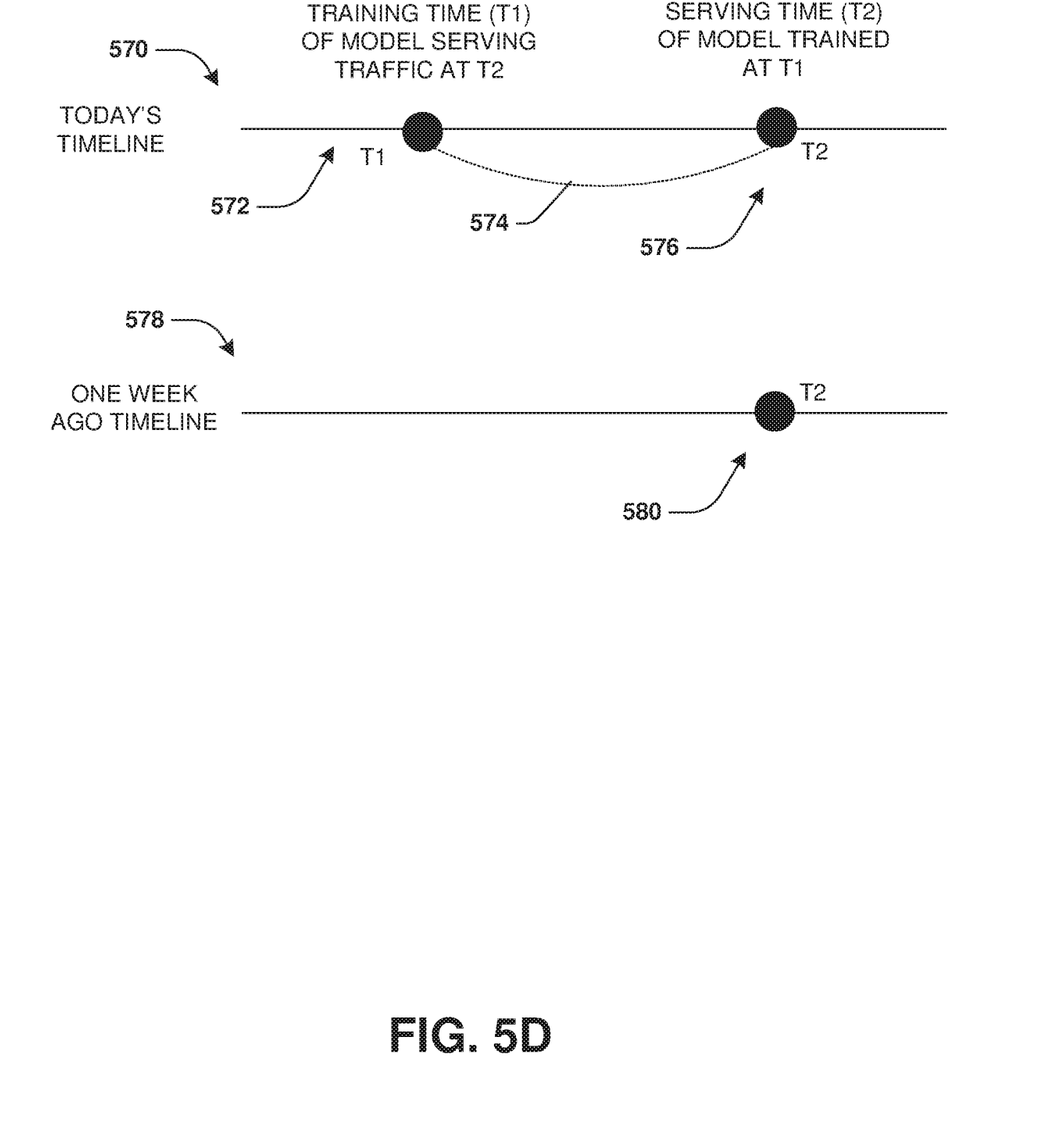
FIG. 5D is an illustration of example timelines utilized for identifying a historical data time interval.

FIG. 5D illustrates an example where the current day is a weekend day. A current time may correspond to a training time (T1) 572 of the model 508 (e.g., 9:00 am on Saturday the 14$^{th}$), illustrated along today's timeline 570. The model serving delay time 510 is illustrated along today's timeline 570 as model serving delay 574. Adding the model serving delay 574 to the training time (T1) 572 results in a predicted serving time (T2) 576 of when the trained model 508 is predicted to be serving traffic with content recommendations (e.g., 9:00 am+3 hours is 12:00 pm on Saturday the 14$^{th}$). Accordingly, a historical data time interval is determined to start at the predicted serving time (T2) 576 a week prior to the current day, as illustrated by time (T2) 580 on one week ago timeline 578 (e.g., Saturday the 7$^{th}$ starting at 12:00 pm).

Once the historic data time interval is determined, the historic user distribution data and the historic content distribution data occurring within the historic data time interval is identified as the historical training data 506. In this way, the historical training data 506 may comprise content attributes of content items that were available to serve and/or were served as content recommendations during the historic data time interval, event data indicating whether users viewed and/or interacted with the content recommendations, user attributes of the users whom were served with the content recommendations, and/or other historic user distribution data and historic content distribution data.

At 406, the model 508 is trained using the current training data 504 and the historical training data 506 in order to predict user content preferences of users. In an example of training the model 508, a first step size (a first weight value) is applied to the historic user distribution data and the historic content distribution data of the historical training data 506. A step size may correspond to an importance of training data, such as the current training data 504 and the historical training data 506, for training the model 508 (e.g., how much the training of the model 508 should consider/take into account certain training data). The larger the step size, the more important the training data, and thus the training will take such training data into greater consideration for training the model 508. The smaller the step size, the less important the training data, and thus the training will take such training data into less consideration for training the model 508. That is, the larger the step size, the more the model 508 will aggressively try to accommodate a learning entry (input of the training data having the larger step size), thus changing an internal representation within the model 508 so that the model will not fail to predict a click probability for identical/similar input in the future. Lowering the step size means that the model 508 will be less aggressive in trying to fit the model 508 to the learning entry. In an example, step sizes may range from 0 to 1 or any other range. Because the historical training data 506 is beneficial for training the model 508 to accurately predict user content preferences but may be less beneficial than the current training data 504, the first step size may be less than a second step size assigned to the current training data 504 (e.g., the first step size may be set to 0.7 and the second step size may be set to 1). In this way, the step sizes are used to signal to the model 508 that the historical training data 506 should affect the model 508 less than the current training data 504.

In another example of training the model 508, a historical interval ratio may be applied to the historic user distribution data and the historic content distribution data. Because not all historical training data 506 may be needed to sufficiently train the model 508, the historical interval ratio may be used to select a subset of the historic user distribution data and the historic content distribution data for training the model 508 (e.g., 30%, 35%, or any other percentage of the historic user distribution data and the historic content distribution data may be selected to train the model 508). The historical interval ratio may be based upon a current training time of training the model 508, an amount of data available to train the model 508 (e.g., an amount of the current training data 504 and/or an amount of the historical training data 506), experimental results of previously training the model 508 using a prior set of historical training data (e.g., if training the model 508 using the prior set of historical training data resulted in a large improvement in accuracy of the model 508 for predicting user content preferences, then the historical interval ratio may be increased), and/or other factors. At 408, once the model 508 has been trained using the current training data 504 and the historical training data, the model 408 is used to actively serve requests for content recommendations.

Figure 6:
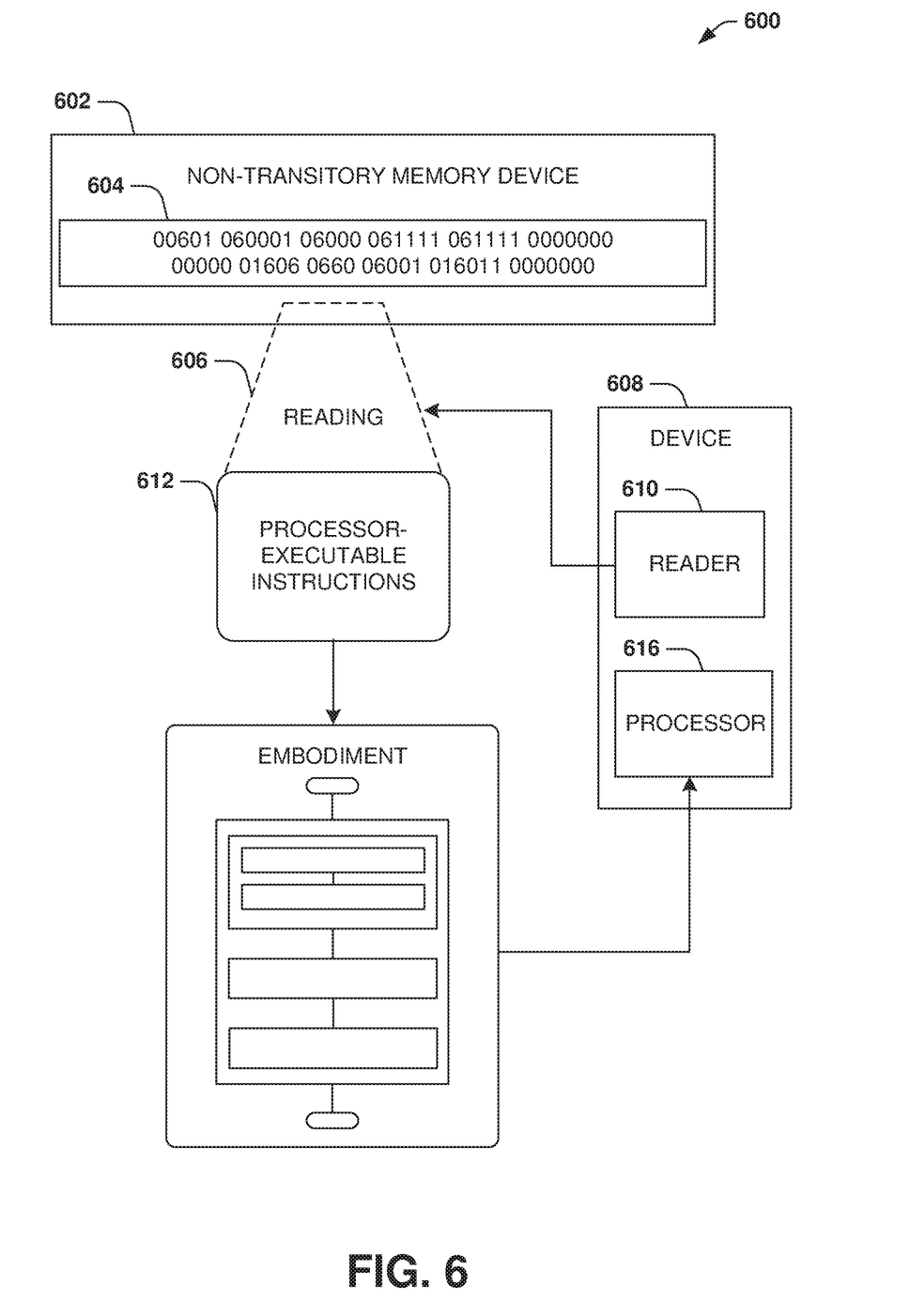
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 400 of FIG. 4, for example. In some embodiments, the processor-executable instructions 612 are configured to cause implementation of a system, such as at least some of the example system 500 of FIG. 5A, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
computing, by a recommendation system hosted by one or more servers, a model serving delay time as an average of training delays of events, wherein a training delay corresponds to a difference between an event serve time of an event and a train time of a model that served a recommendation associated with the event;
in response to determining that a current day occurs within a set of weekdays, determining, by the recommendation system hosted by the one or more servers, a historical data time interval as a day prior to the current day plus the model serving delay time;
using the historical data time interval to identify historic user distribution data and historic content distribution data associated with the historical data time interval;
training, by the recommendation system hosted by the one or more servers, the model for predicting user content preferences using the historic user distribution data and the historic content distribution data associated with the historical data time interval;
utilizing the model to generate a content recommendation for a user;
providing, by the recommendation system hosted by the one or more servers, the content recommendation for display on a client device of the user; and
in response to detecting a first event corresponding to the user interacting with the content recommendation, generating an entry indicating an event type of the first event, a first serve time of the model serving the content recommendation, and a first train time of the model being trained using the historic user distribution data and the historic content distribution data.

2. The method of claim 1, comprising:
applying a first step size to the historic user distribution data and the historic content distribution data for training the model.

3. The method of claim 2, wherein the first step size is less than a second step size applied to current user distribution data and current content distribution data used to train the model.

4. The method of claim 1, comprising:
applying a historical interval ratio to the historic user distribution data and the historic content distribution data to select a subset of the historic user distribution data and the historic content distribution data for training the model.

5. The method of claim 4, comprising:
determining the historical interval ratio based upon at least one of a current training time of training the model or an amount of data available to train the model.

6. The method of claim 4, comprising:
determining the historical interval ratio based upon experimental results of training the model using historical user and content distribution data.

7. The method of claim 1, comprising:
providing second content recommendation for display on the client device of the user.

8. The method of claim 7, comprising:
in response to detecting a second event associated with the second content recommendation, generating a second entry indicating a second event type of the second event, a second serve time of the model serving the second content recommendation, and a second train time of the model being trained using the historic user distribution data and the historic content distribution data.

9. The method of claim 8, wherein the second event corresponds to an impression of the user viewing the second content recommendation.

10. The method of claim 1, comprising:
in response to determining that the current day is a weekend day, determining the historical data time interval as a week prior to the current day plus the model serving delay time.

11. The method of claim 1, comprising:
in response to determining that the current day is a weekday not within the set of weekdays, determining the historical data time interval as a plurality of days prior to the current day plus the model serving delay time.

12. The method of claim 1, comprising:
in response to determining that the current day is a weekend day, determining the historical data time interval as a day prior to the current day plus the model serving delay time.

13. A computing device comprising:
a processor; and
memory comprising processor-executable instructions that when executed by the processor cause performance of operations, the operations comprising:
computing, by a recommendation system hosted by one or more servers, a model serving delay time as an average of training delays of events, wherein a training delay corresponds to a difference between an event serve time of an event and a train time of a model that served a recommendation associated with the event;
in response to determining that a current day is a weekend day, determining, by the recommendation system hosted by the one or more servers, a historical data time interval as a week prior to the current day plus the model serving delay time;
using the historical data time interval to identify historic user distribution data and historic content distribution data associated with the historical data time interval;
training, by the recommendation system hosted by the one or more servers, the model for predicting user content preferences using the historic user distribution data and the historic content distribution data associated with the historical data time interval;
utilizing the model to generate a content recommendation for a user;
providing, by the recommendation system hosted by the one or more servers, the content recommendation for display on a client device of the user; and
in response to detecting a first event corresponding to the user interacting with the content recommendation, generating an entry indicating an event type of the first event, a first serve time of the model serving the content recommendation, and a first train time of the model being trained using the historic user distribution data and the historic content distribution data.

14. The computing device of claim 13, comprising:
in response to determining that the current day occurs within a set of weekdays, determining the historical data time interval as a day prior to the current day plus the model serving delay time.

15. The computing device of claim 14, comprising:
in response to determining that the current day is a weekday not within the set of weekdays, determining the historical data time interval as a plurality of days prior to the current day plus the model serving delay time.

16. The computing device of claim 15, wherein the plurality of days correspond to 3 days prior to the current day.

17. A non-transitory machine readable medium having stored thereon processor-executable instructions that when executed cause performance of operations, the operations comprising:
computing, by a recommendation system hosted by one or more servers, a model serving delay time as an average of training delays of events, wherein a training delay corresponds to a difference between an event serve time of an event and a train time of a model that served a recommendation associated with the event;
in response to determining that a current day is a weekend day that does not occur within a set of weekdays, determining, by the recommendation system hosted by the one or more servers, a historical data time interval as a plurality of days prior to the current day plus the model serving delay time;
using the historical data time interval to identify historic user distribution data and historic content distribution data associated with the historical data time interval;
training, by the recommendation system hosted by the one or more servers, the model for predicting user content preferences using the historic user distribution data and the historic content distribution data associated with the historical data time interval;

utilizing the model to generate a content recommendation for a user;

providing, by the recommendation system hosted by the one or more servers, the content recommendation for display on a client device of the user; and in response to detecting a first event corresponding to the user interacting with the content recommendation, generating an entry indicating an event type of the first event, a first serve time of the model serving the content recommendation, and a first train time of the model being trained using the historic user distribution data and the historic content distribution data.

18. The non-transitory machine readable medium of claim 17, wherein the plurality of days correspond to 3 days prior to the current day.

19. The non-transitory machine readable medium of claim 17, wherein the operations comprise:

in response to determining that a second current day occurs within the set of weekdays, determining a second historical data time interval as a day prior to the second current day plus a second model serving delay time.

20. The non-transitory machine readable medium of claim 17, wherein the operations comprise:

in response to determining that the current day is a weekend day, determining the historical data time interval as a week prior to the current day plus the model serving delay time.

* * * * *